United States Patent
Lockyer (10) Patent No.: US 8,794,132 B2
(45) Date of Patent: Aug. 5, 2014

(54) CUTTING APPARATUS FOR CURED CHEESE BLOCKS

(75) Inventor: Andy Lockyer, South Petherton (GB)

(73) Assignee: Tetra Laval Holdings & Finance S.A., Pully (CH)

( * ) Notice: Subject to any disclaimer, the term of this patent is extended or adjusted under 35 U.S.C. 154(b) by 352 days.

(21) Appl. No.: 13/321,728

(22) PCT Filed: May 27, 2010

(86) PCT No.: PCT/IB2010/052373
§ 371 (c)(1),
(2), (4) Date: Jan. 23, 2012

(87) PCT Pub. No.: WO2010/136994
PCT Pub. Date: Dec. 2, 2010

(65) Prior Publication Data
US 2012/0125209 A1 May 24, 2012

(30) Foreign Application Priority Data
May 28, 2009 (NL) ................................. 2002943

(51) Int. Cl.
*A01J 11/00* (2006.01)

(52) U.S. Cl.
USPC ................................ 99/452; 99/456

(58) Field of Classification Search
CPC ......... A01J 25/167; A01J 11/04; A01J 15/12; A23C 19/00; A47J 43/284; A47J 43/145
USPC ................................. 83/77, 79, 803
See application file for complete search history.

(56) References Cited

U.S. PATENT DOCUMENTS

| 3,468,026 A * | 9/1969 | Charles et al. ............... 99/454 |
| 4,152,101 A * | 5/1979 | Charles ......................... 425/85 |
| 4,539,902 A * | 9/1985 | Brockwell et al. ........... 99/454 |
| 5,209,943 A | 5/1993 | Pittelko |

OTHER PUBLICATIONS

International Search Report under date of mailing of Oct. 6, 2010 in connection with PCT/IB2010/052373.

* cited by examiner

*Primary Examiner* — Tu B Hoang
*Assistant Examiner* — Alba Rosario-Aponte
(74) *Attorney, Agent, or Firm* — Finnegan, Henderson, Farabow, Garrett & Dunner, LLP (57) ABSTRACT

An apparatus for preparation of cheese comprising at least one vertical column, a guillotine knife for cutting of curd blocks, and a guide of guiding the guillotine knife having plastic guide strips overlying its longitudinal edges.

19 Claims, 5 Drawing Sheets

CUTTING APPARATUS FOR CURED CHEESE BLOCKS

CROSS-REFERENCE TO RELATED APPLICATIONS

This application represents the national stage entry of PCT International Application No. PCT/IB2010/052373 filed May 27, 2010 which claims benefit of Netherlands Patent Application 2002943 filed May 28, 2009.

FIELD

The invention relates to an apparatus for preparing cheese, comprising at least one vertical tubular column for receiving and compacting cheese curd, provided with a guillotine knife for cutting off curd blocks, wherein the guillotine knife in operation moves back and forth between an open position in which a curd block to be cut off can pass the guillotine knife and a closed position in which the guillotine knife supports a curd column situated in the tubular column, and wherein guiding means are provided for guiding the guillotine knife, which guiding means comprise at least two mutually parallel extending stationary girders, which have mutually facing surfaces in which guiding slots are provided which receive the longitudinal edges of the guillotine knife.

BACKGROUND

In the cheese production process, in a known manner, curd is prepared from milk in a curd maker. Usually, the curd in the curd maker is stirred and cut and the whey thereby released is partly discharged and for the rest is supplied together with the curd mass via a buffer tank to an apparatus for producing blocks of cheese. Although cheese can be prepared from curd in many ways, in large-scale cheese production often use is made of so-called draining or forming columns. In the processing of pre-acidified curd, e.g. in the production of Cheddar-type cheese, forming columns (also called block formers) are used where pre-drained and acidified and salted curd is processed. Draining columns are used in the processing of a whey-curd mixture shortly after curd making. Both types of columns comprise a hollow vertical tube placed on a support, to which, in operation, at the top, a mixture of curd and whey is supplied in the case of draining columns, or the acidified and pre-drained but still whey-containing curd in the case of forming columns. In such a column, the curd is increasingly compacted from the top down, so that at the bottom of the column curd blocks can be cut off. To this end, at the bottom of the column, a horizontally acting guillotine knife is placed. The guillotine knife closes off the column and in the closed position supports the curd column. The guillotine knife is periodically opened, so that the curd column in the tube can move down over a settable distance. To this end, a dosing plate vertically reciprocable in a sliding sleeve (in case of draining columns) or dosing chamber (in case of forming columns) is present, which is placed under the guillotine knife. Prior to opening of the guillotine knife the dosing plate is moved to a position just below the guillotine knife, taking over the support of the curd column when the guillotine knife is opened. Thereupon the dosing plate is moved down over a settable distance, which corresponds to the desired height of the curd block. When thereupon the guillotine knife is moved into the closing position again, a curd block is thereby cut off from the curd column and the knife in turn takes over the curd column supporting function from the dosing plate.

The cut-off curd block now lies on the dosing plate in the sliding sleeve, or dosing chamber. The dosing plate is then moved further down until the curd block is at the bottom of the sliding sleeve or dosing chamber. Then, in the case of draining columns the sliding sleeve with the curd block therein is moved sideways to a position above a cheese mold and transferred into the cheese mold. In the case of forming columns, the cut-off curd block is moved out sideways with the aid of one of the sidewalls via an opposite sidewall which can be swung clear or removed, and is externally moved to a filling installation.

The guillotine knife has a front end and a rear end and two longitudinal edges. The front end forms a cutting edge, while the rear end is connected with drive means, which can comprise, for example, a pneumatic cylinder, and which can cause the guillotine knife to move back and forth between the open position and the closed position. The two longitudinal edges are in the guiding slots of guiding means. The guiding means typically comprise two elongate guiding blocks of a suitable plastic such as, for example, polyethylene of the UHMWP (Ultra High Molecular Weight Polyethylene) type, or other suitable plastic. The guiding blocks are usually fixedly mounted in and/or between stainless steel frame parts under the vertical tubular column and are provided with the guiding slots mentioned, in which the longitudinal edges of the guillotine knife are guided.

The known guiding means hence comprise plastic guiding blocks, which are mounted on stainless steel frame parts. Since plastic materials and stainless steel have different thermal expansion coefficients, slits may be formed between mutually abutting surfaces of these different materials, which are difficult to clean and during use constitute a potential source of infection by accumulation of product residues. Also, via such slits, leakage can arise. In block formers, use is made of air pressure differences between on the one hand the interior of the vertical tubular column and the dosing chamber and on the other hand the environment, as well as of air pressure differences between the interior of the column and the interior of the dosing chamber. Leakage via slits between plastic guiding blocks and stainless steel frame parts is therefore undesired.

SUMMARY

The invention contemplates making an improved construction available, in which the problems outlined do not occur or at least occur to a reduced extent.

To this end, according to the invention, an apparatus of the above-described type is characterized in that the longitudinal edges of the guillotine knife are provided with plastic guide strips overlying the longitudinal edges, which guide strips are provided with a number of recesses bounded by intermediate sections and end sections, which recesses leave parts of the longitudinal edges of the guillotine knife exposed, wherein the guide strips are arranged on the guillotine knife so as to be slidable back and forth in longitudinal direction over a predetermined distance, and wherein the outer surface of at least a number of the sections of the guide strips cooperates with the guiding slots for the longitudinal edges of the guillotine knife.

It is noted that in a so-called single column, in each case a single curd block is cut off. In the case of a multiple column, there are multiple vertical curd receiving tubes present in the column, and also, in operation, multiple curd blocks are cut off at the same time by the guillotine knife. These are received in a sliding sleeve having multiple receiving spaces, also called cassette.

In the following, for the sake of simplicity, the starting point is an apparatus having a single column, such as, for example, the Tetra Tebel Blockformer® marketed by applicant. However, the invention is also applicable to a draining column, such as, for example, the Tetra Tebel Casomatic® SC marketed by applicant and to apparatuses having one or more multiple columns, such as, for example, the Tetra Tebel Casomatic® MC marketed by applicant.

In the following, the invention will be further elucidated with reference to the appended drawings.

DETAILED DESCRIPTION

Figure 1:
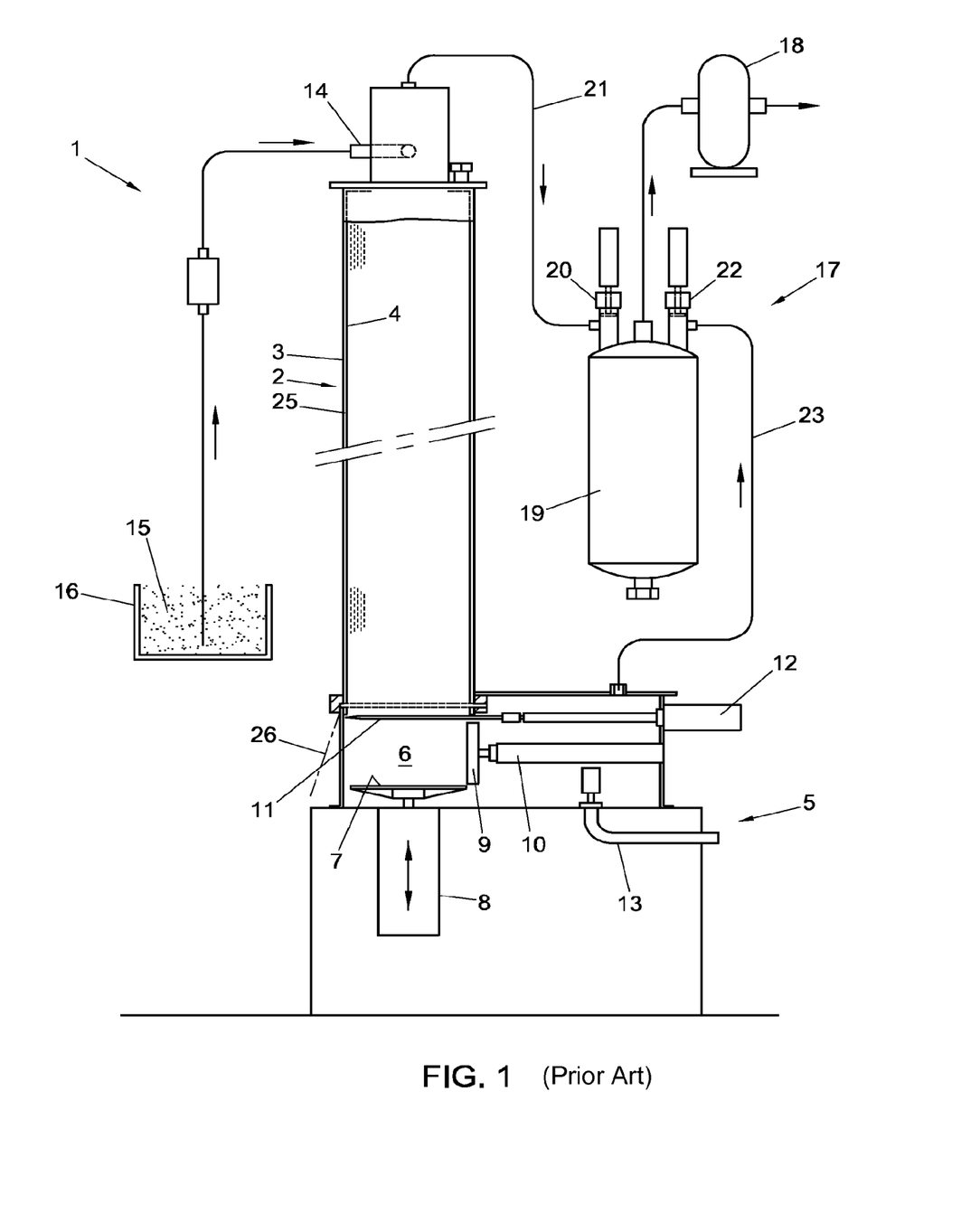
FIG. 1 schematically shows a side elevation of an example of a known apparatus for the preparation of cheese, provided with a guillotine knife.

FIG. 1 schematically shows an example of a known cheese preparation apparatus 1 for producing cheese of the Cheddar type. The apparatus 1 is also called block former and in this example comprises a single vertical forming column 2, which comprises a tubular outer jacket 3 and, extending vertically within the outer jacket, a perforated draining tube 4. Between the draining tube and the outer jacket is an interspace 25.

The forming column 2 is placed on a support 5, which contains a dosing chamber 6. In the dosing chamber 6 are a dosing plate 7, which is operated by a lifting cylinder 8, and an ejection plate 9, which is operated by an ejection cylinder 10. Further disposed in the dosing chamber is a horizontally acting guillotine knife 11, which is operated by a cylinder 12. The guillotine knife 11 in the closed position shown forms a partition between the interior of the forming column 2 and the dosing chamber 6.

In operation, at the top of the forming column, via a supply tube 14, predrained curd particles, also called curd chips, are supplied. The curd particles 15 are contained, in this example, in a schematically indicated storage vessel 16 and in operation are drawn from the storage vessel in that a vacuum is created in the forming column. To this end, a vacuum apparatus 17 is present, which in this example comprises a vacuum pump 18 and a vacuum tank 19. The vacuum tank 19 is connected via a control valve 20 and a first vacuum line 21 with the interior of the forming column. Furthermore, the vacuum tank 19 is connected in this example via a control valve 22 and a second vacuum line 23 with the dosing chamber 6.

During initial filling of the column with curd, the guillotine knife 11 is in the closed position, as shown in FIG. 1. Resting on the guillotine knife, in operation, is a curd column (not shown) present in the vertical draining tube 4. The curd column is drained via the perforations in the draining tube 4 and via the interspace 25 between the outer jacket and the draining tube. The whey egressing from the curd column in this example flows via the perforations and the interspace to the dosing chamber 6 and can there be discharged via a discharge device 13.

As a result of drainage and its own weight the curd column is compacted in the perforated tube from the top down. At the lower end of the curd column, periodically a block is cut off by means of the guillotine knife 11. To this end, first the dosing platform 7 is brought to a point just below the guillotine knife by means of the lifting cylinder 8. Thereupon, with the aid of the cylinder 12 the guillotine knife is moved into the open position (to the right in FIG. 1), so that the curd column can come down onto the platform 7. After this, the platform 7 is moved downwards over a settable distance. Thereupon the guillotine knife is brought into the closed position again, so that a block is cut off from the curd column. The cut-off block can then be moved sideways out of the dosing chamber 6 by means of the ejection plate 9 and the ejection cylinder 10. To this end, a wall part 26 situated opposite the ejection plate 9 is of hingeable design, as is indicated with a broken line in FIG. 1.

To promote the downward movement of the curd column, the vacuum in the vertical tubular column may be temporarily removed with the aid of the control valve 20, resulting in a pressure difference between the interior of the column and the dosing chamber 6. This pressure difference enhances the downward force acting on the curd column.

The guillotine knife 11 moves in guiding means, which are not shown in FIG. 1.

Figure 2:
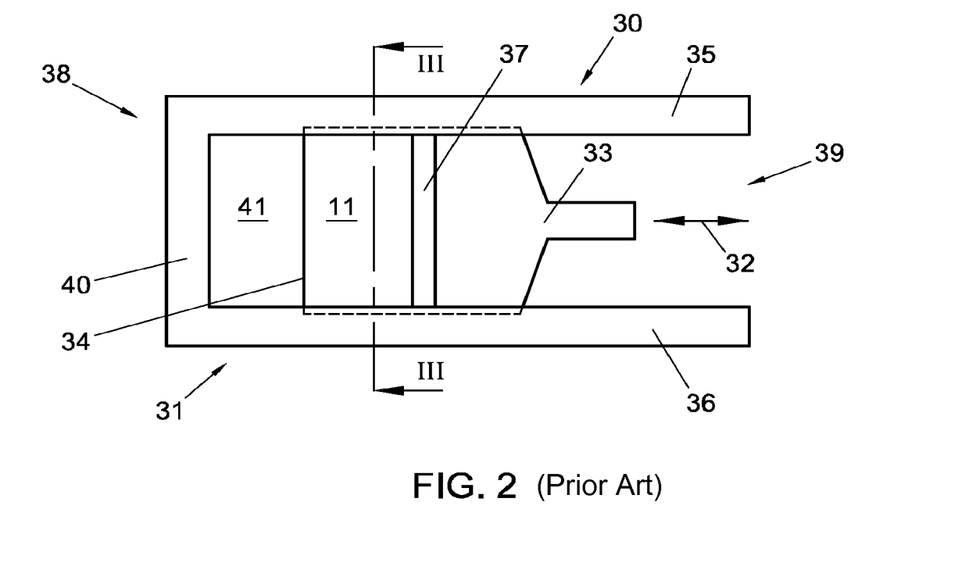
FIG. 2 schematically shows in top plan view an example of a known design of a frame for guiding a guillotine knife.
Figure 3:
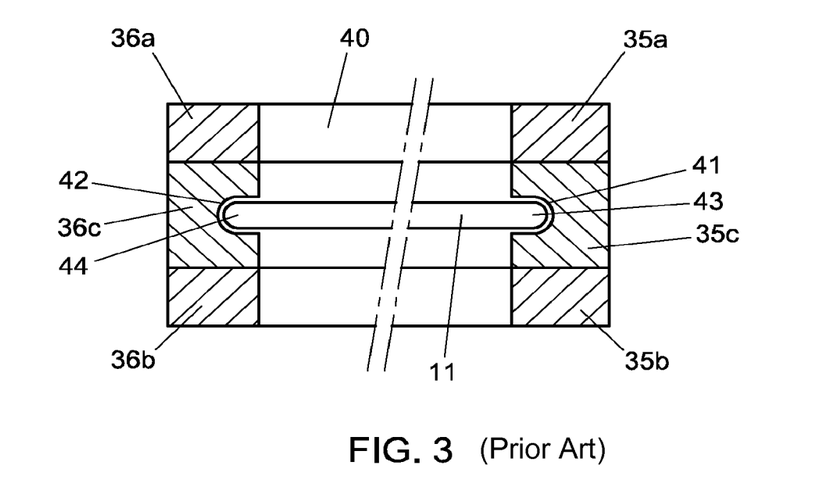
FIG. 3 schematically shows in cross section along the line III-III in FIG. 2 a part of the frame of FIG. 2.

FIG. 2 and FIG. 3 schematically show in top plan view and in cross section an example of guiding means according to the state of the art for a guillotine knife. FIG. 2 shows in top plan view an assembly 30 of a guillotine knife 11 and a stationary frame 31 enclosing and guiding the guillotine knife. The frame is often designated as H-frame. The guillotine knife 11 can be moved back and forth in the frame following the double-headed arrow 32, by a cylinder 12 (FIG. 1). The cylinder 12 is connected with the rear end 33 of the guillotine knife. At the front, the guillotine knife 11 is provided with a sharp cutting edge 34.

The H-frame has two parallel legs 35, 36 extending in the direction of movement of the guillotine knife and with an interspace determined by the width of the guillotine knife, the legs 35, 36 being connected through a central cross connection 37, which divides the H-frame into a front and a rear section 38, 39. The rear end 33 of the guillotine knife is in the rear section 39, which is open in the example shown but may also be provided with a cross connection. In the front section 38 the cutting edge 34 of the guillotine knife is active. The front section is provided with a front cross connection 40, which together with the central cross connection and the front parts of the legs 35, 36 forms a passage opening 41 for the curd column.

In FIG. 2 the guillotine knife is drawn in the half-open position. In the closed position, the cutting edge 34 is disposed against, in or under the cross connection 40. In the wholly open position, the cutting edge is within or under the central cross connection 37, so that the passage opening 41 is wholly clear and the curd column can move downwards.

As shown in FIG. 3, in this example the legs 35, 36 are each built up of stainless steel upper and lower parts 35a, 35b, and 36a, 36b, respectively, between which elongate plastic guiding or bearing blocks 35c and 36c are mounted, which have substantially the same length as the path to be traveled in operation by the guillotine knife 11.

The bearing blocks are manufactured from a suitable type of plastic and on the mutually facing sides are provided with guiding slots 41, 42, in which the side edges 43, 44 of the guillotine knife 11 are guided.

As already indicated above, due to thermal expansion phenomena, small crevices or slits may be formed between the contact surfaces of the bearing blocks and the stainless steel parts, which are difficult to clean by the customary CIP (cleaning in place) systems and which may even lead to leakage and hence vacuum loss.

The edges 43 and 44 of the guillotine knife are a close fit in the slots 41 and 42 of the bearing blocks. In the drawing a rather wide fit can be seen, but this has been drawn so only for the sake of clarity. In reality, the edges of the guillotine knife fit into the slots of the bearing blocks so closely that while the guillotine knife can easily slide back and forth, clearance is minimal. This has as a consequence that the longitudinal edge areas of the guillotine knife are always closely confined and hence are difficult to clean. Although the guillotine knife is slid back and forth during a cleaning cycle, the longitudinal edges always remain covered, unlike the guiding slots themselves, all parts of which are temporarily exposed as the guillotine knife slides back and forth.

FIGS. 4 to 10 schematically illustrate by way of example a construction according to the invention with which the problem of hard-to-clean spots is solved, or at least reduced, and with which a layered construction of the H-frame can be avoided.

Figure 4:
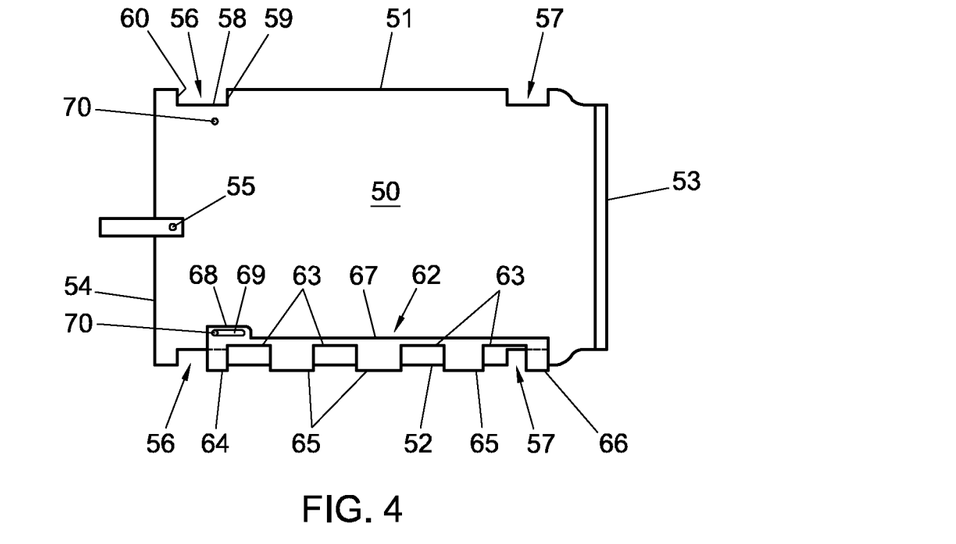
FIG. 4 schematically illustrates the basic idea of the invention.
Figure 5:
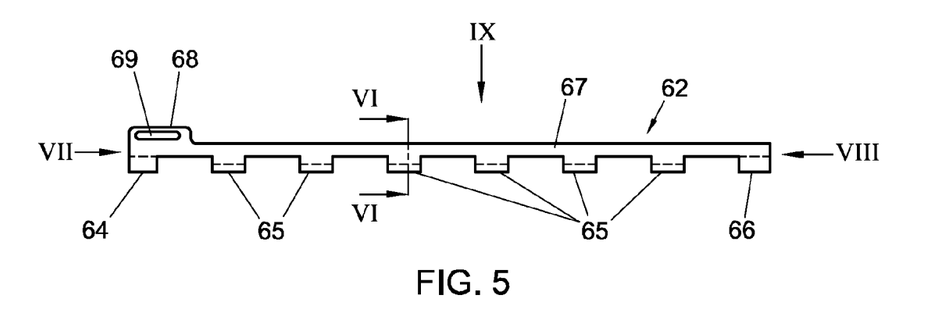
FIGS. 5 to 10 successively show, for the sake of completeness, an example of a guide strip for use in an apparatus according to the invention in top plan view, in cross section along the line VI-VI in FIG. 5, in end view according to the arrow VII in FIG. 5, in end view according to the arrow VIII in FIG. 5, in front view according to arrow IX in FIG. 5, and in longitudinal section along the line X-X in FIG. 9.
Figure 6:
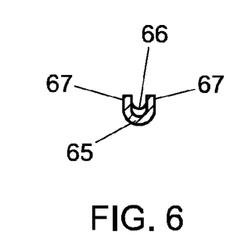
Figure 7:
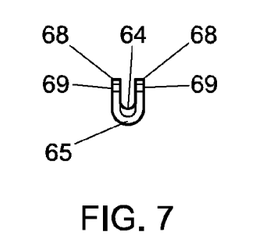
Figure 8:
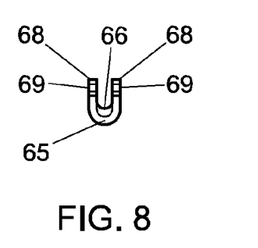
Figure 9:
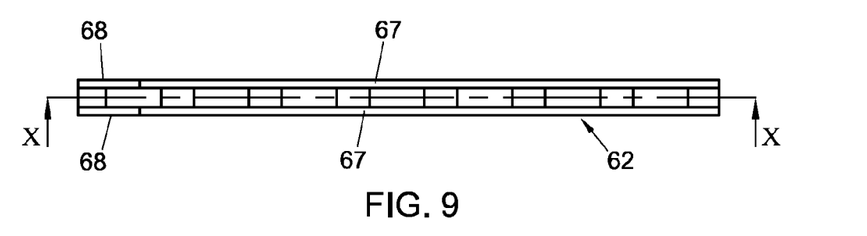
Figure 10:
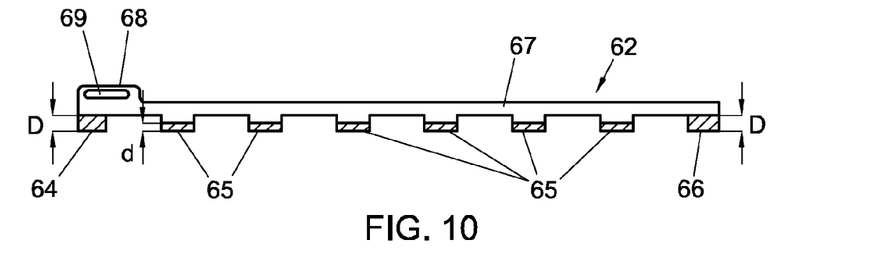

FIG. 4 schematically shows a top plan view of an example of a guillotine knife which, in the drawing, is provided on one side edge with a similar guide strip to that shown in FIGS. 5 to 10.

The guillotine knife 50 shown in FIG. 4 has two side edges 51, 52, which in operation are received in guiding means for guiding the guillotine knife during back-and-forth movements between the open position and the closed position. Furthermore, the guillotine knife 50 is provided in the usual manner with a front edge, which forms a cutting edge 53, and a rear edge 54. Provided near the rear edge is a fastening point 55 for drive elements.

In the example shown, each side edge is provided with a first recess 56 near the rear edge and with a second recess 57 near the front or cutting edge. The recesses are rectangular in shape and are bounded by a bottom edge, which extends parallel to the respective side edge of the guillotine knife, and two end edges, which extend substantially transversely to the bottom edge and the side edge of the guillotine knife. At the recess 56 in the side edge 51, for clarity, the bottom wall of the recess is indicated with 58 and the end edges are indicated with 59 and 60. As will be elucidated in more detail in the following, the end edges serve as stops.

In FIG. 4, for clarity, only one side edge of the guillotine knife 50 is provided with a guide strip 62, but, of course, in a practical situation both side edges are provided with a guide strip. In operation, the outer surfaces of the guide strips abut directly against the inner surface of guiding slots of the stationary guiding means, and the guide strips move together with the edges of the guillotine knife through the guiding slots. The example of a guide strip shown in FIG. 4 is essentially a strip of U-shaped cross section, which overlies a side edge of a guillotine knife and which is provided with a number of recesses which leave parts of the side edge of the guillotine knife exposed. The guide strip 62 of FIG. 4 has four of such recesses 63, which, viewed in the longitudinal direction of the strip, are each bounded on opposite sides by U-shaped intermediate sections or bridges 65 and end sections 64 and 66. The intermediate sections and the end sections are connected with each other by two narrow junction strips 67, respectively lying on the top and the bottom surface of the guillotine knife and extending substantially throughout the length of the guide strip.

The strip 62 is so fastened to the guillotine knife that the strip is carried along during the back and forth movement of the guillotine knife, but at the same time can slide relative to the guillotine knife in the longitudinal direction. As a result, edge parts of the guillotine knife are alternately covered and exposed. If the recesses 63 have the same length in the longitudinal direction as the intermediate sections 65, all parts of the edge of the guillotine knife can become fully exposed for some time in alternation as the strip moves back and forth along the guillotine knife. Therefore, during a CIP cycle all edge parts of the guillotine knife can be properly cleaned. The same holds for the inner surfaces of the guiding slots, which is relevant in particular for the sections of the guiding slots that correspond to the overlapping portion of the stroke of the knife. This concerns those sections that are covered both in the front (closed) and the rear (open) position of the knife.

In the example shown, both end sections 64 and 66 of the guide strip 62 lie in recesses 56 and 57 in the edge of the guillotine knife. To this end, the end sections have, in a direction transverse to the direction of movement of the guillotine knife and viewed in the plane of the guillotine knife, a greater thickness D than the thickness d of the intermediate sections, as can be clearly seen in FIG. 10. The thickness D in this example is substantially equal to the thickness d of the intermediate sections added to the depth of the recesses 56 and 57, respectively.

Although in FIG. 4 a guide strip 62 with four recesses, three intermediate sections and two end sections is shown, while in FIGS. 5 to 10 a guide strip with seven recesses is shown, the same reference numerals are used in FIG. 4 and FIGS. 5 to 10 for the guide strip and parts thereof.

The thickened end sections 64 and 66 of the guide strip lying in the recesses 56, 57 of the guillotine knife limit the distance over which the guide strip can slide relative to the guillotine knife. The transverse edges of the recesses can then function as stop elements. A similar effect can be obtained with just one recess or, conversely, multiple recesses in the edges of the guillotine knife. These recesses and the associated thickened sections of a guide strip do not necessarily need to be situated at the ends of the guide strip.

In the example shown, the guide strip 62 is provided, at its end situated near the rear end 54 of the guillotine knife 50, with a relatively short widened portion 68 which overlies the guillotine knife in transverse direction slightly further than the rest of the strip and which in this example is situated at both the top side and the underside of the guillotine knife. Provided in the widened portion is a slot 69 extending in the longitudinal direction of the guide strip, which slot 69 in mounted condition receives a fastening element extending transversely to the plane of the guillotine knife, in the form of a projection 70, for example, a cam or a pin extending through the guillotine knife. The assembly of pin 70 and slot 69 prevents a lateral movement of a guide strip relative to the guillotine knife. If desired, the slot may further, whether or not together with one or more thickened sections of a guide strip extending into corresponding recesses in a guillotine knife, serve to limit the sliding path of the guide strip.

It is noted that fastening means, such as the combination of a pin and a slot or other fastening means to fasten a guide strip on the edge of a guillotine knife are, in principle, not needed, because the guillotine knife and the guide strips in mounted condition are confined between and in the stationary guiding means. However, if such fastening means are used, the stationary guiding means can be made of simpler design and may, for example, be substantially limited to the area of the passage opening 41 (FIG. 2) for the curd column. Since the front portion of the guillotine knife always needs to remain closely enclosed by the stationary guiding means, fastening means that are active near the rear side of the guillotine knife can suffice. In FIGS. 4, 5, 10 and 12 the pin 70 is situated near the rear side of the guillotine knife, and the slot 69 is provided in the guide strip, likewise near the rear side of the guillotine knife 50.

The slot should be long enough to enable the back-and-forth movement of the guide strip along the side edge of the guillotine knife. If the slot is longer than the desired sliding path of the guide strip along the guillotine knife, other slide limitation means are needed, such as, for example, the above-described recesses 56, 57 together with thickened parts 64, 66 of the guide strip. If the slot is as long as the desired sliding path, it can also function, together with a projection 70, as slide limitation means. In that case, the slot can optionally replace the recesses in the knife edge and the thickened parts of the guide strip.

In the foregoing, a widened portion of the guide strip provided with a slot has been described as present on both surfaces of the guillotine knife 50. The widened portion may also extend slightly rearwards with respect to the slot, as will be described below in more detail with reference to FIG. 14.

It is also possible to have a pin 70 project outside the surface of the guillotine knife on just one side, that is, the top side or the underside. The pin then needs to cooperate with just one slot 69. If desired, use can then be made of a guide strip likewise having on just one of the sides a widened portion provided with a slot. Such a construction may be used, in particular, if the material of the guide strip is not very flexible. Mounting a guide strip on the guillotine knife may then be done as indicated in outline in FIG. 14.

Figure 14:
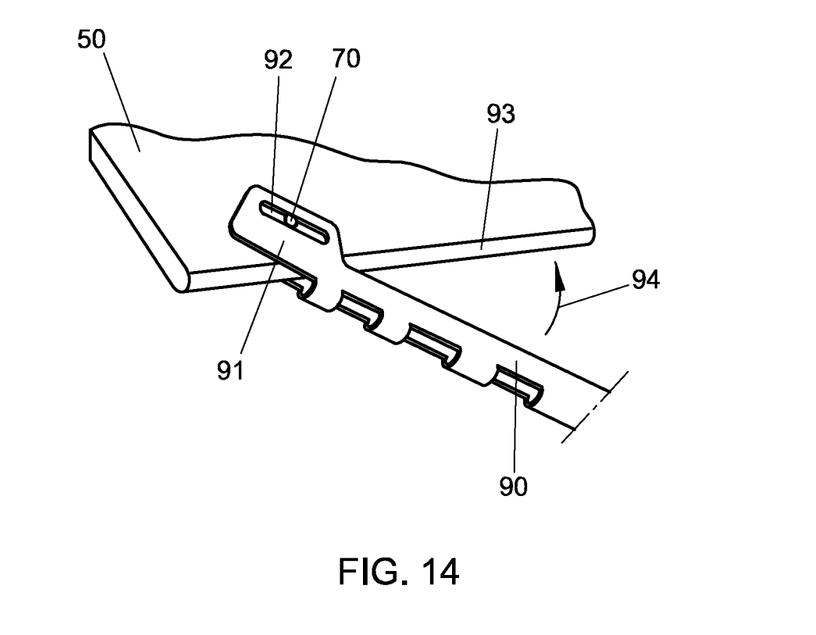
FIG. 14 schematically illustrates a fastening method for a guide strip.

FIG. 14 shows a part of a guillotine knife 50 with a retaining pin 70. Furthermore, FIG. 14 shows a part of a guide strip 90 provided with recesses as described in the foregoing. The guide strip 90 has on just one side, the top side in the drawing, a widened portion 91 having therein a slotted hole 92 extending in the longitudinal direction of the guide strip.

The widened portion 91 extends rearwards with respect to the rest of the guide strip. The guide strip is fastened onto the guillotine knife by laying the widened portion with the slot over the projection 70, with the guide strip pivoted outwardly with respect to the guillotine knife. Then the guide strip is pivoted inwardly, as indicated with an arrow 94, so that the guide strip ends up overlying the edge of the guillotine knife.

When the guillotine knife has been provided with guide strips in this way, it can be slipped between the stationary guiding means.

In FIG. 14 the side edge 93 of the guillotine knife is not provided with recesses. The limitation of the sliding path of the guide strip is effected in this case by the combination of slot and projection.

To ensure that the guide strips of a guillotine knife do in fact slide along the guillotine knife when the guillotine knife during a CIP cycle makes a back-and-forth movement between the open and the closed position, it is possible to provide in the stationary guiding means (the H-frame) stop elements, such as, for example, cams, near the front and the rear end of the path to be traveled by the guillotine knife. A front cam engages the front end section 66 of a guide strip when the guide strip is in a forwardly moved position, as shown in FIG. 4. The front cam then stops the guide strip, so that it slides rearwards with respect to the guillotine knife.

Figure 11:
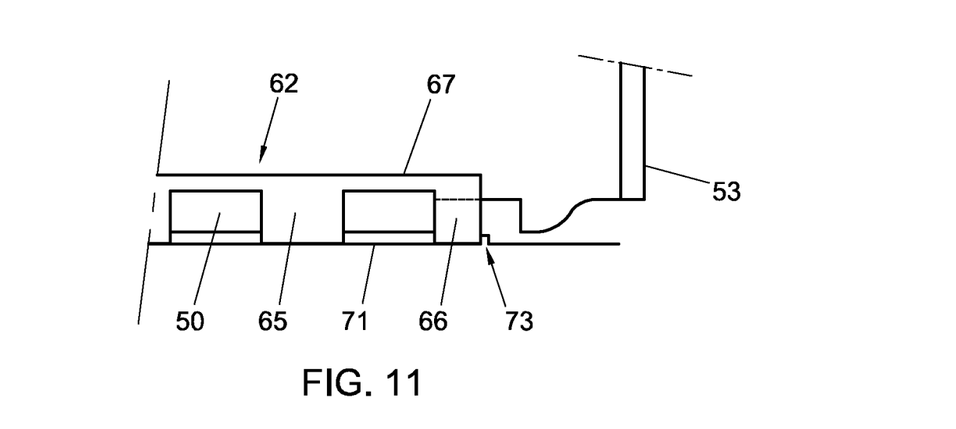
FIGS. 11 and 12 schematically show a front and a rear portion of a guillotine knife edge with guide strip.
Figure 12:
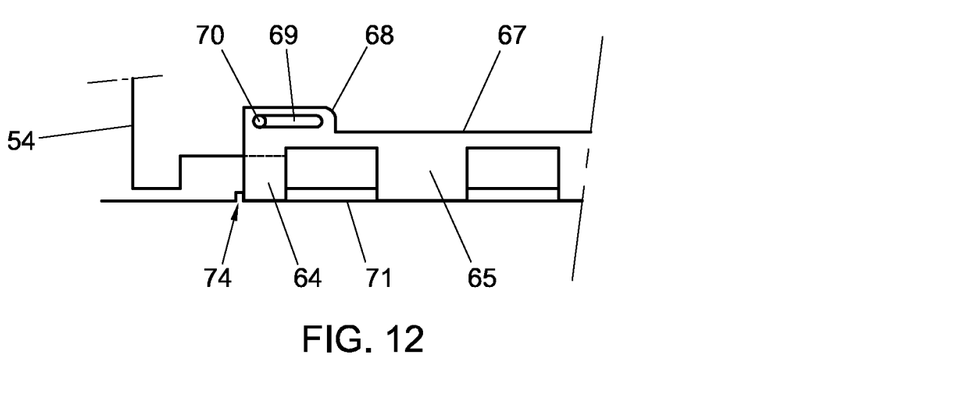

For the sake of completeness, FIG. 11 shows schematically an example of such a cam. FIG. 11 shows a portion of a guillotine knife 50 that corresponds to the right-hand bottom corner of FIG. 4. The part of the H-frame enclosing the guillotine knife and the guide strips in the operating condition is indicated with 71 and a front cam is indicated with 73. The cam 73 can be a separately arranged stop element, but could also be formed by a portion of a cross connection of the H-frame, such as the cross connection 40 in FIG. 2, if the front portion of the guillotine knife in the closed condition extends into a slit or a recess in the cross connection. A similar cam 75 is shown in FIG. 12. The cam 75 pushes a guide strip 62 forwards in case it is still in the rearwardly moved position when the guillotine knife 50 is approaching the rear position. The cam 75 is preferably a simply removable cam, so that the guillotine knife with the guide strips can be simply mounted and demounted.

Figure 13:
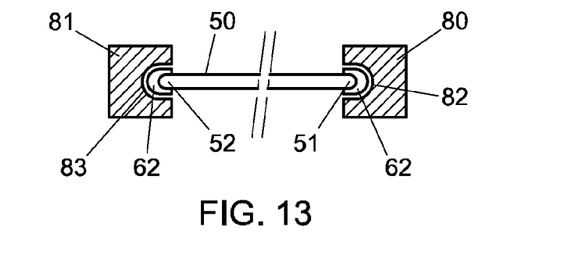
FIG. 13 schematically shows in cross section a guillotine knife with guide strips received in girders of guiding means.

FIG. 13 shows schematically in cross section two legs or longitudinal girders 80, 81 of an H-frame for an apparatus according to the invention. The girders are each provided with a longitudinal slot 82, 83 in which are received the longitudinal edges 51, 52 of a guillotine knife 50 provided with guide strips 62 of the above-described kind. For the sake of clarity, there is shown some space between the guide strips 62 and the walls of the longitudinal slots 82, 83. In reality, the guide strips abut directly against the surface of the longitudinal slots. The girders of the H-frame can therefore be manufactured in one piece and do not need to contain any plastic bearing blocks.

Also, owing to the absence of separate plastic bearing blocks, such as are present in the known construction of FIG. 3, there are no slits present between such bearing blocks and parts of the H-frame. Accumulation of product residues in such slits is hence not possible in a construction according to the invention. Nor is leakage via such slits possible anymore, owing to the absence thereof in the construction according to the invention.

The guide strips can be manufactured from any suitable food grade plastic, such as, for example, UHMWP, and can, if desired, be simply and rapidly replaced.

An apparatus of the kind described can be simply and effectively cleaned with a CIP system owing to the guide strips in operation sliding relative to the guillotine knife and relative to the other guiding means.

It is noted that after the foregoing, diverse constructional variants will readily occur to those skilled in the art. Such variants are understood to fall within the framework of the invention.

The invention claimed is:
1. An apparatus for the preparation of cheese, comprising at least one vertical tubular column for receiving and compacting cheese curd;
a guillotine knife for cutting off curd blocks from the cheese curd received by said at least one tubular column, wherein the guillotine knife moves between an open position in which a curd block to be cut off can pass the guillotine knife and a closed position in which the guillotine knife supports the curd situated in the tubular column;

a guide for guiding the guillotine knife between said open position and said closed position, said guide including at least two mutually parallel extending stationary girders, which have mutually facing surfaces in which guiding slots are provided which receive the longitudinal edges of the guillotine knife; and plastic guide strips overlying the longitudinal edges of the guillotine knife, said guide strips having a number of recesses bounded by intermediate sections and end sections, said recesses leaving parts of the longitudinal edges of the guillotine knife exposed, wherein the guide strips are arranged on the guillotine knife so as to be slidable back and forth in a longitudinal direction over a predetermined distance, and wherein an outer surface of at least a number of the sections of the guide strips cooperates with the guiding slots for the longitudinal edges of the guillotine knife.

2. An apparatus according to claim 1, in which the length of the recesses and the intermediate sections of the guide strips and the distance over which the guide strips can slide back and forth over the guillotine knife are tuned to each other, such that during a back and forth sliding movement of a guide strip all parts of the longitudinal edges of the guillotine knife originally covered by the intermediate sections and end sections are exposed.

3. An apparatus according to claim 1, in which the intermediate sections and the end sections of at least one of the guide strips are connected with each other through narrow junction strips extending in the longitudinal direction of the guide strip, which in mounted condition extend over a top surface and a bottom surface of the guillotine knife.

4. An apparatus according to claim 1, including a stop element limiting the distance over which a guide strip can slide along a longitudinal edge of a guillotine knife.

5. An apparatus according to claim 4, in which the stop element includes at least one recess having a front and a rear stop edge in a longitudinal edge of the guillotine knife, and a part of a guide strip engaging in the at least one recess, which part can slide back and forth between the front and the rear stop edge.

6. An apparatus according to claim 5, in which a part of the guide strip engaging in the at least one recess is a thickened intermediate section or end section of the guide strip.

7. An apparatus according to claim 5, in which the stop element includes a front and a rear recess in a longitudinal edge of a guillotine knife, wherein the front recess cooperates with a front thickened end section of a guide strip and the rear recess cooperates with a rear thickened end section of the guide strip.

8. An apparatus according to claims 1, including a stop element limiting the distance over which a guide strip can slide along a longitudinal edge of a guillotine knife and which can also serve as fastening means for a guide strip.

9. An apparatus according to claim 1, including at least one slotted opening in a part of a guide strip lying on a top surface or bottom surface of the guillotine knife, as well as at least one projection of the guillotine knife, which extends into the at least one slotted opening, wherein the slotted opening extends in the longitudinal direction of the guillotine knife and has a length such that the guide strip can slide back and forth in longitudinal direction over the predetermined distance.

10. An apparatus according to claim 9, in which a projection situated at the top side or at the underside of the guillotine knife near the end of the guillotine knife remote from the cutting edge extends into a slotted opening of a guide strip.

11. An apparatus according to claim 10, in which the projection is formed by an end of a pin extending through the guillotine knife.

12. An apparatus according to 9, in which the at least one slotted opening and the at least one projection form at least part of a stop element.

13. An apparatus according to claim 9, in which the at least one slotted opening is provided in a part of a guide strip that extends rearwards.

14. An apparatus according to claim 1, in which the guiding slots for the longitudinal edges of the guillotine knife are slots formed in stainless steel girders.

15. An apparatus according to claim 1, in which the girders provided with guiding slots are girders in one piece.

16. An apparatus according claim 1, in which the guide is provided with stop elements near a front and a rear end of a path to be traveled by the guillotine knife, wherein the front stop element engages a guide strip when the guide strip upon a forward movement of the guillotine knife is in a forwardly moved position on the guillotine knife and causes the guide strip to slide rearwards relative to the guillotine knife, and wherein the rear stop element engages a guide strip when the guide strip upon a rearward movement of the guillotine knife is in a rearwardly moved position on the guillotine knife and causes the guide strip to slide forwards relative to the guillotine knife.

17. A plastic guide strip for use in an apparatus according to claim 1, in which the guide strip has a substantially U-shaped cross section with a bottom and two legs, wherein a side edge of a guillotine knife is received between said two legs and the guide strip viewed in the longitudinal direction has at least in the bottom and immediately contiguous parts of the legs a number of recesses which are bounded by intermediate sections and end sections.

18. A plastic guide strip according to claim 17, in which at least one of the intermediate or end sections has a thickened bottom that cooperates with a recess provided in the edge of a guillotine knife.

19. A plastic guide strip according to claim 17, in which the intermediate and end sections are connected by narrow junction strips in operation lying on the top and bottom surface, wherein at least one of the junction strips at the end lying near the rear side of the guillotine knife has a widened portion which is provided with a slot into which in operation a projection of the guillotine knife extends.

* * * * *